United States Patent [19]

Rathbun et al.

[11] 4,298,956
[45] Nov. 3, 1981

[54] DIGITAL READ RECOVERY WITH VARIABLE FREQUENCY COMPENSATION USING READ ONLY MEMORIES

[75] Inventors: Donald J. Rathbun, Andover; David B. O'Keefe, Westford, both of Mass.

[73] Assignee: Honeywell Information Systems Inc., Waltham, Mass.

[21] Appl. No.: 38,977

[22] Filed: May 14, 1979

[51] Int. Cl.³ .......................... G06F 7/22; G11B 5/09
[52] U.S. Cl. .................................. 364/900; 360/39
[58] Field of Search ... 364/200 MS File, 900 MS File; 360/26, 39, 45; 371/1, 6, 47, 65; 307/231, 232, 269; 328/72, 108, 109, 120, 179; 235/92 FQ, 92 TF, 92 PS, 92 PE

[56] References Cited

U.S. PATENT DOCUMENTS

| | | | |
|---|---|---|---|
| 3,108,261 | 10/1963 | Miller | 360/44 X |
| 3,431,559 | 3/1969 | Webb | 364/900 |
| 3,668,645 | 6/1972 | Reymond et al. | 364/900 |
| 3,790,954 | 2/1974 | Devore et al. | 371/1 |
| 3,792,436 | 2/1974 | De Voy et al. | 371/1 |
| 4,000,513 | 12/1976 | Precourt | 360/45 |
| 4,034,348 | 7/1977 | Rathbun | 364/900 |
| 4,040,022 | 8/1977 | Takii | 364/900 |
| 4,054,950 | 10/1977 | Boone | 364/900 |
| 4,109,236 | 8/1978 | Besenfelder et al. | 371/6 |
| 4,118,686 | 10/1978 | Lender | 371/6 |
| 4,173,027 | 10/1979 | Rathbun | 360/45 |

Primary Examiner—Gareth D. Shaw
Assistant Examiner—Thomas M. Heckler
Attorney, Agent, or Firm—George Grayson; Nicholas Prasinos; Ronald T. Reiling

[57] ABSTRACT

Digital data is recorded on the surface of a magnetic media such as a disk or diskette in the form of magnetic flux transitions identifying clock and data information in a modified frequency modulation (MFM) mode. A read head senses the flux transitions which are in turn converted to digital signals. A counter in the adapter starts to count when the adapter receives a digital signal. The count is transferred to a register and the counter presets when the adapter receives the next digital signal. The count is indicative of the time between the successive digital signals and should be representative of multiples of an integer. The count signals stored in the register address a read only memory whose output signals preset the counter to a value to compensate for the difference between the expected time and the actual time between the successive digital signals thereby reducing the read error rate.

7 Claims, 9 Drawing Figures

CONTENTS OF PROM 64-ADDRESS LOCATIONS

| ADDRESS LOCATIONS (MFM) (DECIMAL) | | PRMBXX+00 XX | | | |
|---|---|---|---|---|---|
| | | 04 | 03 | 02 | 01 |
| 0- 46 | NOT USED | 0 | 0 | 0 | 0 |
| 47- 71 | 2 μSEC LAST BIT CLOCK | 0 | 0 | 0 | 0 |
| 72- 94 | 3 μSEC LAST BIT CLOCK | 0 | 0 | 1 | 1 |
| 95-122 | 4 μSEC LAST BIT CLOCK | 1 | 1 | 0 | 0 |
| 123-173 | NOT USED | 0 | 0 | 0 | 0 |
| 174-199 | 2 μSEC LAST BIT DATA | 0 | 0 | 1 | 1 |
| 200-222 | 3 μSEC LAST BIT DATA | 1 | 0 | 0 | 0 |
| 223-250 | 4 μSEC LAST BIT DATA | 1 | 0 | 1 | 0 |
| 251-255 | NOT USED | 0 | 0 | 0 | 0 |

*FIG. 5*

CONTENTS OF PROM 64-ADDRESS LOCATIONS

| ADDRESS LOCATIONS (FM) (DECIMAL) | | PRMBXX+00 XX | | | |
|---|---|---|---|---|---|
| | | 04 | 03 | 02 | 01 |
| 256-339 | 2 μ SEC LAST BIT CLOCK | 0 | 0 | 1 | 1 |
| 340-378 | 4 μ SEC LAST BIT CLOCK | 0 | 0 | 0 | 0 |
| 379-467 | 2 μ SEC LAST BIT DATA | 1 | 0 | 0 | 0 |
| 468-519 | 4 μ SEC LAST BIT DATA | 1 | 1 | 1 | 0 |

*FIG. 6*

CONTENTS OF PROMS 90 AND 92 ADDRESS LOCATIONS

| ADDRESS LOCATIONS | RDPMXX+00 XX | | | | | ADDRESS LOCATIONS | RDPMXX+00 XX | | | | |
|---|---|---|---|---|---|---|---|---|---|---|---|
| | 05 | 04 | 03 | 02 | 01 | | 05 | 04 | 03 | 02 | 01 |
| 0-169 | 1 | 0 | 0 | 0 | 0 | 212 | 1 | 0 | 0 | 0 | 0 |
| 170 | 0 | 0 | 1 | 1 | 1 | 213 | 1 | 0 | 0 | 0 | 0 |
| 171 | 0 | 1 | 0 | 0 | 0 | 214 | 1 | 0 | 0 | 0 | 0 |
| 172 | 0 | 1 | 0 | 0 | 0 | 215 | 1 | 0 | 0 | 0 | 1 |
| 173 | 0 | 1 | 0 | 0 | 1 | 216 | 1 | 0 | 0 | 1 | 0 |
| 174 | 0 | 1 | 0 | 0 | 1 | 217 | 1 | 0 | 0 | 1 | 0 |
| 175 | 0 | 1 | 0 | 1 | 0 | 218 | 1 | 0 | 0 | 1 | 1 |
| 176 | 0 | 1 | 0 | 1 | 0 | 219 | 1 | 0 | 1 | 0 | 0 |
| 177 | 0 | 1 | 0 | 1 | 1 | 220 | 1 | 0 | 1 | 0 | 1 |
| 178 | 0 | 1 | 1 | 0 | 0 | 221 | 1 | 0 | 1 | 1 | 0 |
| 179 | 0 | 1 | 1 | 0 | 0 | 222 | 0 | 1 | 0 | 0 | 0 |
| 180 | 0 | 1 | 1 | 0 | 1 | 223 | 0 | 1 | 0 | 0 | 0 |
| 181 | 0 | 1 | 1 | 0 | 1 | 224 | 0 | 1 | 0 | 0 | 1 |
| 182 | 0 | 1 | 1 | 1 | 0 | 225 | 0 | 1 | 0 | 1 | 0 |
| 183 | 0 | 1 | 1 | 1 | 0 | 226 | 0 | 1 | 0 | 1 | 0 |
| 184 | 0 | 1 | 1 | 1 | 1 | 227 | 0 | 1 | 0 | 1 | 1 |
| 185 | 1 | 0 | 0 | 0 | 0 | 228 | 0 | 1 | 0 | 1 | 1 |
| 186 | 1 | 0 | 0 | 0 | 0 | 229 | 0 | 1 | 1 | 0 | 0 |
| 187 | 1 | 0 | 0 | 0 | 0 | 230 | 0 | 1 | 1 | 0 | 1 |
| 188 | 1 | 0 | 0 | 0 | 0 | 231 | 0 | 1 | 1 | 0 | 1 |
| 189 | 1 | 0 | 0 | 0 | 0 | 232 | 0 | 1 | 1 | 1 | 0 |
| 190 | 1 | 0 | 0 | 0 | 1 | 233 | 0 | 1 | 1 | 1 | 0 |
| 191 | 1 | 0 | 0 | 1 | 0 | 234 | 0 | 1 | 1 | 1 | 1 |
| 192 | 1 | 0 | 0 | 1 | 0 | 235 | 1 | 0 | 0 | 0 | 0 |
| 193 | 1 | 0 | 0 | 1 | 1 | 236 | 1 | 0 | 0 | 0 | 0 |
| 194 | 1 | 0 | 0 | 1 | 1 | 237 | 1 | 0 | 0 | 0 | 0 |
| 195 | 1 | 0 | 1 | 0 | 0 | 238 | 1 | 0 | 0 | 0 | 0 |
| 196 | 1 | 0 | 1 | 0 | 1 | 239 | 1 | 0 | 0 | 0 | 0 |
| 197 | 1 | 0 | 1 | 1 | 0 | 240 | 1 | 0 | 0 | 0 | 1 |
| 198 | 1 | 0 | 1 | 1 | 0 | 241 | 1 | 0 | 0 | 1 | 0 |
| 199 | 1 | 0 | 1 | 1 | 1 | 242 | 1 | 0 | 0 | 1 | 0 |
| 200 | 1 | 1 | 0 | 0 | 0 | 243 | 1 | 0 | 0 | 1 | 1 |
| 201 | 1 | 1 | 0 | 0 | 1 | 244 | 1 | 0 | 1 | 0 | 0 |
| 202 | 0 | 1 | 0 | 1 | 1 | 245 | 1 | 0 | 1 | 0 | 0 |
| 203 | 0 | 1 | 0 | 1 | 1 | 246 | 1 | 0 | 1 | 0 | 1 |
| 204 | 0 | 1 | 1 | 0 | 0 | 247 | 1 | 0 | 1 | 0 | 1 |
| 205 | 0 | 1 | 1 | 0 | 1 | 248 | 1 | 0 | 1 | 1 | 0 |
| 206 | 0 | 1 | 1 | 0 | 1 | 249 | 1 | 0 | 1 | 1 | 1 |
| 207 | 0 | 1 | 1 | 1 | 0 | 250 | 1 | 0 | 1 | 1 | 1 |
| 208 | 0 | 1 | 1 | 1 | 0 | 251 | 1 | 1 | 0 | 0 | 0 |
| 209 | 0 | 1 | 1 | 1 | 1 | 252 | 1 | 1 | 0 | 0 | 0 |
| 210 | 1 | 0 | 0 | 0 | 0 | 253 | 1 | 1 | 0 | 0 | 1 |
| 211 | 1 | 0 | 0 | 0 | 0 | 254 | 1 | 1 | 0 | 1 | 0 |

FIG. 7

DIGITAL READ RECOVERY WITH VARIABLE FREQUENCY COMPENSATION USING READ ONLY MEMORIES

RELATED APPLICATIONS

The following U.S. Patent Applications filed on an even date with the instant application and assigned to the same assignee as the instant application are related to the instant application.

1. "Digital Frequency Modulation and Modified Frequency Modulation Read Recovery with Data Separation" by Donald J. Rathbun and David B. O'Keefe and having U.S. Ser. No. 038,767.

2. Write Precompensation and Write Encoding for FM and MFM Recording" by Donald J. Rathbun and Peter P. Campbell and having U.S. Ser. No. 039,054.

BACKGROUND OF THE INVENTION

1. Field of Use

The present invention relates generally to data processing systems and more specifically to the recovery of clock and data information written on magnetic media such as is coated on the surface of a disk or diskette where the timing of the information received varies from the expected timing.

2. Description of the Prior Art

The need for higher density recording of digital information on a magnetic medium has fostered the development of numerous encoding schemes including both phase and frequency encoding. With increased data processing speeds placing greater emphasis on high density magnetic recording, industry has resorted to frequency modulation (FM) and modified frequency modulation (MFM) binary information streams. The FM and MFM information streams are generally referred to as single density and double density encoded information, respectively.

U.S. Pat. No. 3,108,261 issued to Miller, entitled "Recording And/Or Reproducing System" describes a form of MFM recording using a considerable amount of circuitry.

FM or single density read recovery is disclosed in U.S. Pat. No. 4,034,348 to Rathbun wherein feedback loops are used to generate timing strobes for detecting both clock and data bits. Further, MFM or double density encoding has been disclosed in a Control Data Corporation project note entitled "MFM Double Density FDD System", dated Nov. 16, 1976. The insertion of an illegal logic zero clock signal in the address mark field to provide an address mark and the use of delay lines to accommodate a read recovery also are disclosed.

The read recovery systems in general have been comprised of frequency sensitive devices such as delay lines, variable frequency oscillators (VFOs), phase lock oscillators (PLOs) and feedback loops for generating timing strobes. The delay lines have exhibited a limited accuracy which is unacceptable in contemporary data processing systems. The VFO and PLO systems must be tuned to the rate at which information is to be received from a storage medium. When the VFO or PLO tuned frequency drifts or the system architecture is changed, a retuning is required to prevent read errors. The accuracy of VFO and PLO systems in addition is affected by the occurrence of write splices which may be present in the information stream as a result of an updating of data records on the storage medium. The delay lines, VFOs and PLOs further are not compatible with integrated circuit implementation. Those read recovery systems using the feedback loop method of generating timing strobes are the more complex of the prior art systems. Because of the complexity, feedback loops have been limited to FM read recovery systems.

Another example of a VFO tuned system is U.S. Pat. No. 3,753,143 entitled "Phase Locked Oscillator for Integer Pulse Rates", describes a means of locking a variable controlled oscillator to the bit rate of the incoming train of data pulses.

U.S. Pat. No. 4,212,038 which issued July 8, 1980 and entitled "Double Density Read Recovery" is directed to a logic system for converting MFM encoded information to a Non-Return to Zero (NRZ) information stream without the use of delay lines, VFOs, PLOs or timing strobe feedback loops. Instead, logic ONE bits occurring in the information stream are applied serially through an input shift register. Outputs of the input shift register are sampled by a multiplexer in response to a control signal indicating the occurrence of clock bits in the MFM information stream. Timing strobes for controlling the operation of the logic read recovery system are thereby generated.

The system described in U.S. Pat. No. 4,212,038 had the disadvantage of requiring a considerable number of integrated circuit elements to provide the read recovery of MFM digital signals. To these logic circuits were added a considerable number of integrated elements to provide the read recovery of FM digital signals.

It should be understood that the references cited herein are those which the applicants are aware and are presented to acquaint the reader with the level of skill in the art and may not be the closest reference to the invention. No representation is made that any search has been conducted by the applicants.

OBJECTS OF THE INVENTION

It is a primary object of the invention to provide a data processing system which includes a peripheral subsystem having improved data recovery apparatus.

It is an object of the invention to provide a data processing system which includes a mass storage subsystem having improved data recovery apparatus.

It is another object of the invention to provide a mass storage subsystem with improved apparatus for decreasing the error rate for information received from the device at a rate varying from the nominal rate.

It is still another object of the invention to provide a mass storage subsystem with improved data recovery apparatus having fewer components and lower cost than does the prior art.

It is yet another object of the invention to provide a mass storage subsystem with improved data recovery apparatus having increased reliability with improved ease of maintenance.

SUMMARY OF THE INVENTION

Information is received from a disk or diskette in the form of a serial stream of bits including clock bits and data bits. The information is coded in a modified frequency modulation (MFM) mode. A cell contains a clock bit position and a data bit position. A cell will never contain both a clock bit and a data bit at binary ONE. If the cell has a data bit at logical ZERO, the clock bit of the cell will be at logical ZERO if the preceding cell has a data bit at logical ONE.

The data stream is applied to a shift register. A predetermined output of the shift register is applied to a counter enabling the counter to store a count of the number of clock pulses between successive information bits in the serial stream of bits. The clock pulse count is a measure of the time between successive bits. This count and in addition a signal whether the previous bit was a clock or data bit are applied to the address terminals of a first programmable read only memory (PROM). The contents of the selected PROM address location indicate whether one cell or two cells of information were received and also whether the information is at binary ONE or binary ZERO.

The count which is a measure of the time between successive bits is applied to the address terminals of a second PROM. Since the times between successive pulses are multiples of an integer, the count indicates if the pulse is received early, on time, or late.

The output of the second PROM presets the counter to a predetermined value when the bit is received "on time". The output of the second PROM presets the counter to a value greater than the predetermined value when the pulse is received late and smaller than the predetermined value when the pulse is received early.

Since the output of the counter addresses the first PROM to determine if the pulse received indicates a binary ZERO or a binary ONE, presetting the counter by varied amounts as determined by the second PROM output allows the system to compensate for variations in bit stream timings.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

DESCRIPTION OF THE PREFERRED EMBODIMENT

Figures 1, 2A:
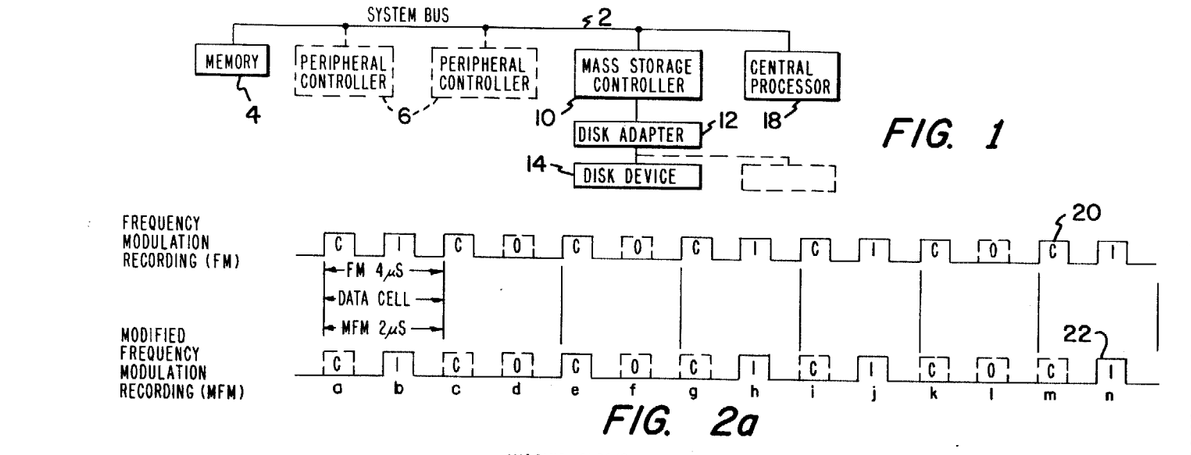
FIG. 1 is a block diagram of a typical system.
FIG. 2a shows typical clock and data bit configurations in the MFM and FM modes.

FIG. 1 shows a typical Honeywell Level 6 Minicomputer System comprising a memory 4, typical peripheral controllers 6, a mass storage controller 10 and a central processor 18; all coupled to a system bus 2. A disk adapter 12 is coupled to mass storage controller 10 and a plurality of disk devices 14 are coupled to the disk adapter 12.

FIG. 2a shows typical data streams made up of clock and data pulses. Data stream 20 is an example of frequency modulation recording (FM) and data stream 22 is an example of modified frequency modulation recording (MFM).

The solid lines indicate the actual wave shape of the data stream after the analog signals generated by the read head of the disk are digitized. The dotted lines indicate the timing positions of binary ZERO bits and clock bits that are not recorded on the media.

Figure 2B:
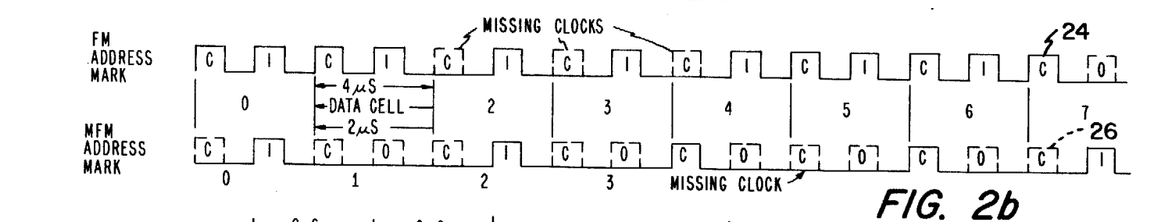
FIG. 2b shows address mark byte bit configurations in the MFM and FM modes.

FIG. 2b shows data streams of an address mark byte 24 in an FM mode of recording and an address mark byte 26 in an MFM mode of recording.

The FM and MFM coding schemes as well as the address mark byte codes are described in the IBM document GA 21-9257-1 entitled: "IBM Two-Sided Diskette Original Equipment Manufacturers Information Second Edition (November 1977)"

Figure 3:
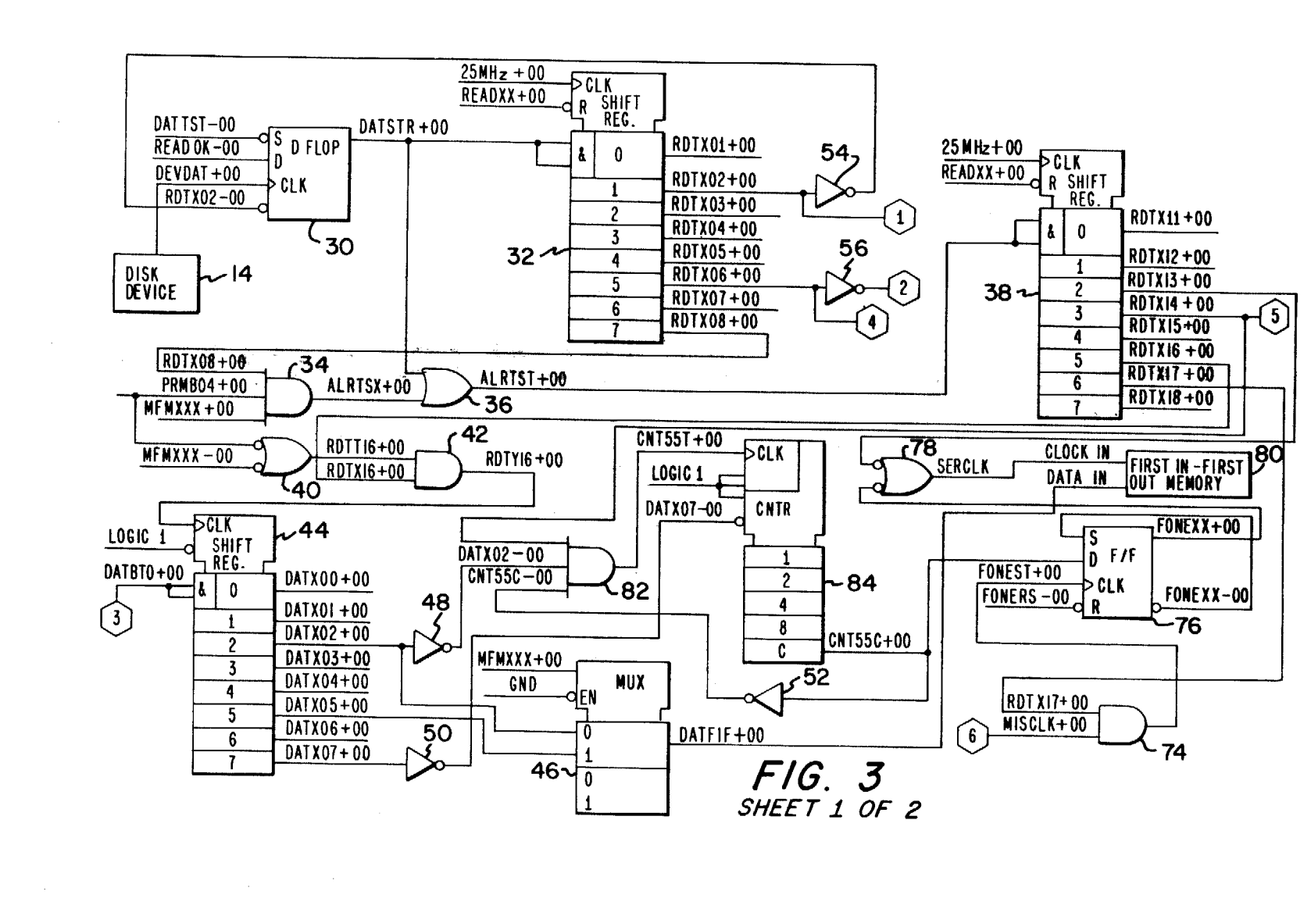
FIG. 3 is a detailed logic diagram of a preferred embodiment of the present invention.

Referring to FIG. 3, flux transitions representing clock pulses or data pulses on the surface of a recording media are sensed by a read head of disk device 14. The analog signal output of the head is digitized and sent to the disk adapter 12. Pulses representative of data and clock bits are applied to the clock input terminal of D-flop 30 which sets on the rise of the 200 nanosecond pulse if the signal READOK-00 input to the D terminal of flop 30 is at logical ONE. The output signal DATSTR+00 is applied to the AND input terminals of a shift register 32 and to the AND input terminals of a shift register 38 through an OR gate 36 via output signal ALRTST+00, and set into the ZERO position on the rise of the free running 25 MHZ+00 clock from a 25 MHZ generator 86 RDTX02+00 is forced to logical ONE on the next rise of the 25 MHZ+00 clock and resets flop 30 through an inverter 54. Pulses are advanced through shift registers 32 and 38 on successive rises of the 25 MHZ+00 clock. When output signal RDTX06+00 is forced to logical ONE, the RDTX06−00 input signal to terminal G1 of counters 58 and 60 is forced to logical ZERO by an inverter 56, presetting the counters 58 and 60 to a predetermined number by means of output signals RDPM01+00 through RDPM05+00 of PROMs 90 and 92. The counters 58 and 60 start a new count on successive rises of the 25 MHZ+00 clock.

The next data or clock pulse received over signal line DEVDAT+00 again sets flop 30 which applies the output signal DATSTR+00 to the ZERO position of shift registers 32 and 38 on the rise of the 25 MHZ+00 clock. Output signal RDTX02+00 is forced to logical ONE on the next rise of the 25 MHZ+00 clock and is applied to the clock input of a register 62. This sets the output of counters 58 and 60 into register 62 whose output signals LTCH01+00 through LTCH08+00 are applied to the input address terminals 1 through 128 respectively of a PROM 64. The binary number represented by the signals LTCH01+00 through LTCH07+00 is a measure of the time between successive input pulses received by flop 30 over signal line DEVDAT+00. Signal line DEVDAT+00 was a data or clock bit.

For the modified frequency modulations (MFM) mode, the output signals of the PROM 64 indicate the following:

| Signals PRMBXX + 00 | | | | |
|---|---|---|---|---|
| XX | | | | |
| 04 | 03 | 02 | 01 | |
| 1 | 1 | 0 | 0 | -04 at logical ONE indicates that two cells of information were received |

-continued

| Signals PRMBXX + 00 | | | | |
|---|---|---|---|---|
| | | | | -03 at logical ONE indicates that the cells of information contain address marks (missing clock) -02 at logical ZERO indicates that the previous bit received was a clock bit and that the second data bit is a binary ZERO -01 at logical ZERO indicates that the first data bit received is a binary ZERO |
| 0 | 0 | 0 | 0 | -04 at logical ZERO indicates that one cell of data was received -02 at logical ZERO indicates that the previous bit received was a clock bit -01 at logical ZERO indicates that the data bit in the cell is a "ZERO" |
| 0 | 0 | 1 | 1 | -04 at logical ZERO indicates that one cell of data was received -02 at logical ONE indicates that although the previous bit could be a data or clock bit, 01 at logical ONE indicates that the bit just received is a binary "ONE" |
| 1 | 0 | 0 | 0 | -04 at logical ONE indicates that two cells of information were received -02 at logical ZERO indicates that the bit in the second cell received is a "ZERO" -01 at logical ZERO indicates that the bit in the first cell received is a "ZERO" |
| 1 | 0 | 1 | 0 | -04 at logical ONE indicates that two cells were received -02 at logical ONE indicates that the bit in the second cell received is a "ONE" -01 at logical ZERO indicates that the bit in the first cell received is a "ZERO" |

Figure 4:
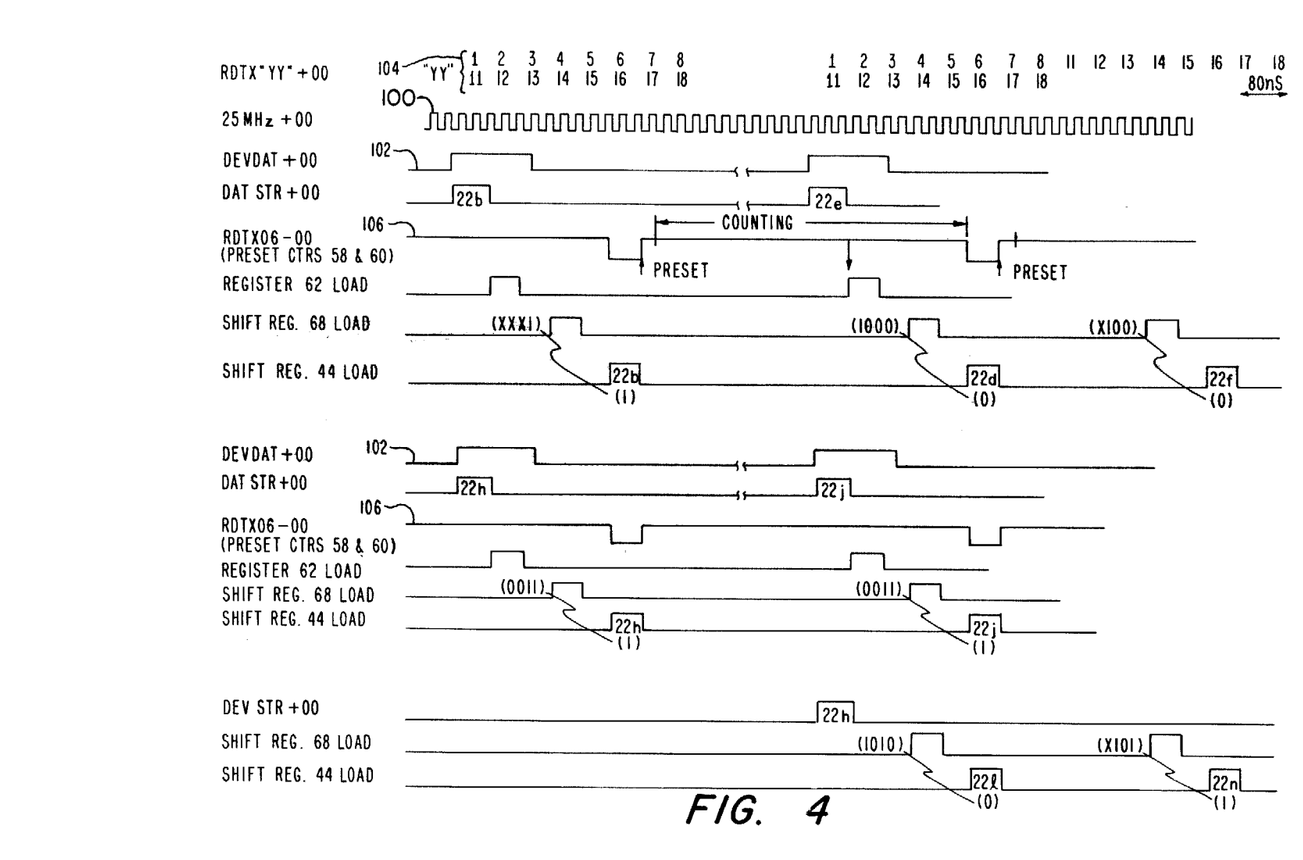
FIG. 4 is a timing diagram of the preferred embodiment.

Referring to the MFM timing signal 22, FIG. 2a in conjunction with the PROM pattern in FIG. 4, receiving pulse 22b over signal line DEVDAT+00 sets flop 30 thereby initiating simultaneous output pulses RDTX01+00 and RDTX11+00 from shift registers 32 and 38 respectively. Note that clock position 22a is at binary ZERO. The output pulses shift on successive rises of the 25 MHZ+00 clock. Output pulse RDTX06-00 again presets counters 58 and 60 to a predetermined number, normally hexadecimal 10. The counters 58 and 60 count 25 MHZ+00 clock pulses until pulse 22e is received over signal line DEVDAT+00. Shift registers 32 and 38 again start shifting on successive rises of the 25 MHZ+00 clock starting with output pulses RDTX01+00 and RDTX11+00. When output signal RDTX02+00 is forced to logical ONE the output signals of counters 58 and 60 are stored in register 62, as is the LSTDAT+00 signal at logical ONE indicating that pulse 22b was a data bit. The output signals of register 62 select one of the address locations between 200 through 222, FIG. 4, from PROM 64. The PROM 64 output signals PRMB04+00 through PRMB01+00, binary signals 1000 respectively, indicate that two cells were read, bit positions 22d and 22f are binary ZEROs and bit position 22e is a clock bit. Bit positions 22b and 22e are approximately 3 microseconds apart. In that time, counters 58 and 60 have counted 75 25 MHZ+00 clock pulses. Since the counters were preset to hexadecimal 10 (16₁₀) after RDTX16-00 time and transferred to register 62 at RDTX02+00 time, the address location selected is 212. (75+16−7+128=212; 128 because the previous bit was a data bit and −7 as the difference between RDTX06-00 and RDTX02+00 time.) The PROM 64 output signals PRMB01+00 through PRMB04+00 are stored in a shift register 68 at the rise of signal RDTX14+00 when signal FHRLDR+00, the output of a flop 66, is at logical ZERO. Flop 66 is set on the rise of signal RDTX06+00 time and reset when signal RDTX02-00 is at logical ZERO. Signal FHRLDR+00 is therefore at logical ZERO at RDTX14+00 time when shift register 68 is loaded. Bit position 22d signal DATBTO+00 at binary ZERO is stored in shift register 44 and shifted at RDTX16+00 time. Shift register 44 is advanced at RDTX16+00 time through a NOR gate 40 and an AND gate 42 since MFMXXX-00 is at logical ZERO and signal RDTT6+00 is at logical ONE. Shift register 44 advances on the rise of signal RDTY16+00. Shift register 68 is shifted at the next RDTX14+00 time and bit position 22f is stored in shift register 44 and shifted at the next RDTX16+00 time. This second cycle was generated by the output signal ALRTSX+00 of an AND gate 34 forcing the RDTX11+00 output signal of shift register 38 to logical ONE through OR gate 36 which shifts through successive rises of the 25 MHZ+00 clock.

Counters 58 and 60 are preset to hexadecimal 10 at RDTX06-00 time after pulse 22e is received. When pulse 22h is received, the output of counters 58 and 60 is again transferred to register 62. Since the previous pulse received was a clock pulse, signal LSTDAT+00 is at logical ZERO thereby selecting the lower half of PROM 64. In this case, the output signals of register 62 select an address location in the range of 72 through 94 in PROM 64, thereby generating output signals PRMB04+00 through PRMB01+00 as binary signals 0011 respectively. The output signal DATBTO+00 at logical ONE is stored in shift register 44 and the output signal LSTDAT+00 is forced to logical ONE to indicate that the pulse 22h is a data bit.

Data pulse 22j results in binary signals 0011 being generated as the output of PROM 64 and a binary ONE being stored in shift register 44.

Data pulse 22n results in binary signals 1010 being generated as the output of PROM 64 resulting in two data bits 22l and 22n being stored in shift register 44 as described supra.

It is necessary to provide synchronization between the information received from the disk adapter 12 and the information to be sent out on system bus 2. Twelve bytes of ZEROs are written on the media track followed by three bytes of address marks. The address marks are characterized by a missing clock transition at the boundary between cells 4 and 5 of each address mark byte.

Shift register 44 stores the binary ZERO data bits received from the disk 14. As the data bits shift through shift register 44, the number of successive binary ZEROs are counted by a counter 84. If the DATX02+00 output of shift register 44 is at logical ZERO, then it is applied through an inverter 48 to an input of an AND gate 82. At RDTX14+00 time, the output signal CNT55T+00 is applied to the clock terminal of the counter 84 which counts on the rise of the clock pulse. The counter 84 is reset by the signal DATX07+00 at logical ONE indicating that a binary ONE is applied to the reset terminal of counter 84 through inverter 50. The output signal CNT55C+00 at logical ONE indicates that three bytes of binary ZEROs were received and prevents counter 84 from advancing by conditioning the output of AND gate 82 through an inverter 52 to logical ZERO. Two bytes of binary ZEROs are indicated by the counter 84 and the third byte of binary ZEROs is stored in the shift register 44.

When the first address mark byte is received with the missing clock pulse, PROM 64 provides a 1100 binary output indicating that two information cells were received with a missing clock bit. The output of a shift register 68, signal MISCLK+00, is applied to an input of an AND gate 74 which at RDTX17+00 time applies an output signal FONEST+00 to the clock input terminal of a D-flop 76, thereby setting flop 76 on the rise of the clock signal. The output signal FONEXX-00 at logical ZERO keeps the flop 76 set. The output signal FONEXX+00 at logical ONE enables a NOR gate 78 to apply RDTX13+00 timing signals to a First In-First Out memory 80 thereby enabling the storing of data signals from output signal DATFIF+00 of a MUX 46.

Either of the input signals CNT55C+00 or FONEXX+00 applied to an OR gate 88 at logical ONE forces the allow clock output signal ALWCLK+OO to logical ONE. If the PROM 64 output signal PRMB02+00 is at logical ONE, the output of an AND gate 72, signal LSTDAT+00 at logical ONE is stored in register 62.

In the FM mode, the upper half of the memory locations of PROM 64 are addressed since the signal MFMXX-00, applied to the address input terminal decimal 256 of PROM 64, is at logical ONE.

For the frequency modulation (FM) mode, the output signals of the PROM 64 indicate the following:

| | Signals PRMBXX × 00 | | | |
|---|---|---|---|---|
| XX 04 | 03 | 02 | 01 | |
| 0 | 0 | 1 | 1 | -04 at binary ZERO identifies the cell as having a data bit<br>-02 at binary ONE identifies the previous bit as a clock bit<br>-01 at binary ONE identifies the data bit as a binary ONE |
| 0 | 0 | 0 | 0 | -04 at binary ZERO identifies the cell as having a data bit<br>-01 at binary ZERO identifies the data bit as a binary ZERO |
| 1 | 0 | 0 | 0 | -04 at binary ONE indicates no data bit in this half cell |
| 0 | 1 | 1 | 1 | -03 at binary ONE identifies the byte as an address mark having a missing clock<br>-02 at binary ONE identifies the previous bit received as a binary ONE<br>-01 at binary ONE identifies this data bit received as a binary ONE |

In the FM mode, signal PRMB04+00 at logical ONE, applied to NOR gate 40, forces the output signal RDTT16+00 to logical ZERO, thereby suppressing the clock input to shift register 44 when writing the address mark. Also in the FM mode, the 0 input terminal of MUX 46 is enabled allowing the DATX02+00 signal to shift data information FIFO 80.

FIG. 4 is a timing diagram of the logic of FIG. 3 processing the data stream 22 of FIG. 2a.

Referring to FIG. 4, the free running 25 MHZ+00 clock signal has a 40 nanosecond cycle time. Data is received as a 200 nanosecond pulse signal DEVDAT+00 102 which sets flop 30. The flop 30 output signal DATSTR+00 is applied to shift registers 32 and 38 to start the timing cycle. This is shown in FIG. 4 as the RDTX"YY"+00 104 timing of 80 nanoseconds per cycle by means of signals RDTX01+00 through RDTX08+00 and RDTX11+00 through RDTX18+00.

In a typical operation as shown in FIG. 4, pulse 22b is received over DATSTR+00. The counters 58 and 60 are preset by timing signal RDTX06-00 to hexadecimal 10 and the counters advance on the rise of successive 25 MHZ clock cycles. Three nanoseconds later, pulse 22e appears on signal line DATSTR+00 which causes the count in counters 58 and 60 to be loaded into register 62. The output of register 62 is applied to the address input terminals of PROM 64 resulting in the binary output signals being at 1000, indicating that two cells of information were received. Binary 1000 is loaded into shift register 68. The low order bit of binary 1000 is transferred to shift register 44 as binary 0 (bit 22d). Binary 1000 is shifted one position to the right on shift register 68 generating binary X100. Again the low order bit, binary ZERO (bit 22f), is transferred to shift register 44.

Note, in the case of the PROM output being binary 1010, the low order binary ZERO indicates that bit position 221 is a binary ZERO. Shifting binary 1010 to binary X101 in shift register 68 results in the low order position having a binary ONE. This is transferred to shift register 44 as a binary ONE (22n).

Figure 5:
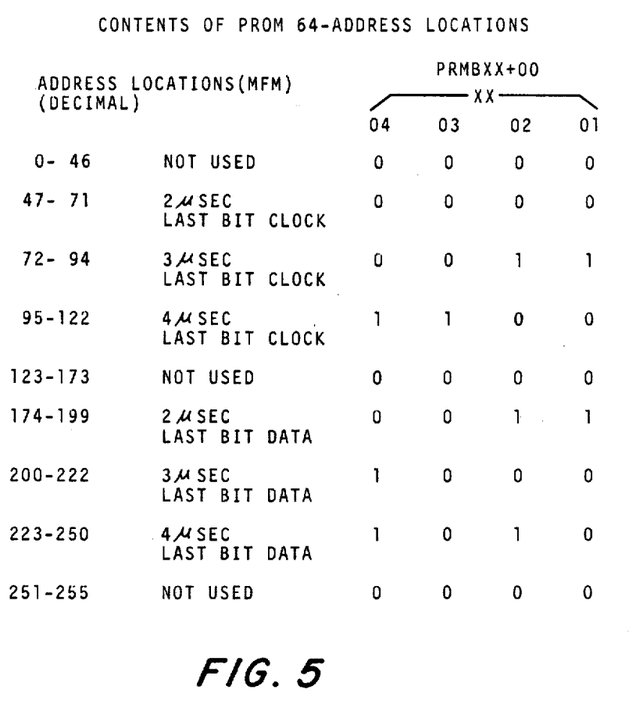
FIG. 5 is a layout of the information stored in the PROM address locations for the MFM mode.

FIG. 5 shows the bit configurations of the lower half of the PROM 64 for the MFM mode. The rule for establishing the MFM coding scheme is:

1. A cell contains a clock position followed by a data position and is two microseconds in duration.

2. If a cell contains a binary ONE data bit, it does not contain a clock bit.

3. If a cell does not have a binary ONE data bit and the previous cell has a binary ONE data bit, then the cell has no clock bit. If the previous cell has a binary ZERO, then the cell has a clock bit.

Therefore in the MFM mode if the previous bit was a clock bit, then the next bit sensed occurs in either two or three nanoseconds. If the next bit occurs in four microseconds, it indicates that the missing clock position of the address mark was read.

If the previous bit was a binary ONE data bit, then the next bit will be sensed in two, three or four microseconds.

Figure 6:
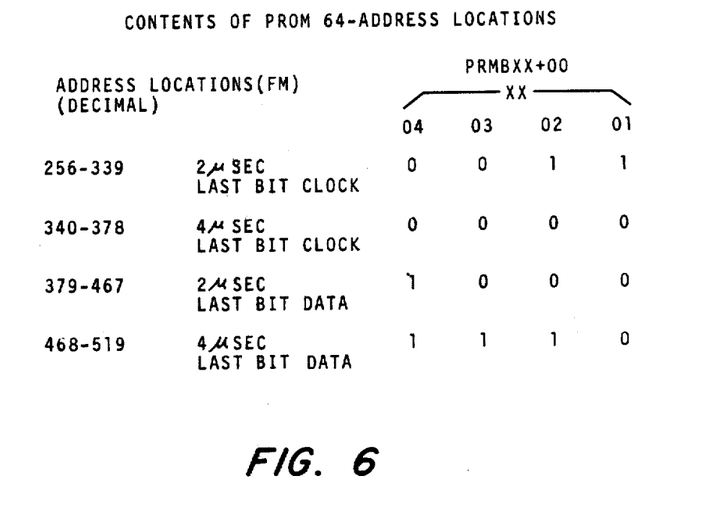
FIG. 6 is a layout of the information stored in the PROM address locations for the FM mode.

Referring to FIG. 6, the FM mode has a clock bit in every cell. A cell is four microseconds long. No pulse is received for a binary ZERO.

If a clock bit is sensed, then the next bit sensed is either a binary ONE in two microseconds or the next clock pulse in four microseconds. If a binary ONE bit is sensed, then the next clock bit sensed in four microseconds indicates that the data is an address mark byte.

Figure 2C:
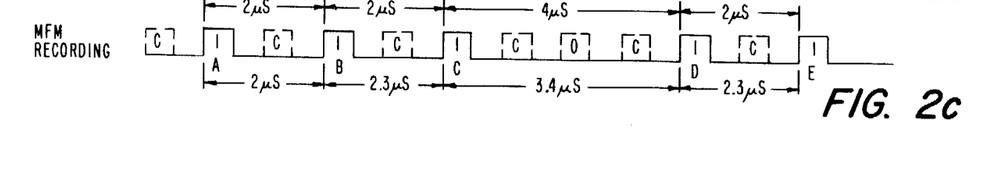
FIG. 2c shows the variable timing of bits received in the MFM mode.

Referring to FIG. 3, the output of the address locations of PROMs 90 and 92 modifies the hexadecimal value preset into counters 58 and 60. The LTCH01+00 through LTCH08+00 signals are applied to the address input terminals of PROMs 90 and 92. Referring to FIG. 2c, the time between pulses A and B is two microseconds. This results in an output count from counters 58 and 60 of $59_{10}$. The counters 58 and 60 were initially preset to $16_{10}$ ($10_{16}$), therefore the counters 58 and 60 counted the rise of the 25 MHZ+00 clock $43_{10}$ lines. The counters 58 and 60 normally count 50 25 MHZ+00 clock cycles in two microseconds. However, the first 25 MHZ+00 clock cycle counted is the rise of the clock following the rise of the RDTX06-00 signal which presets counters 58 and 60 on the eighth clock pulse in the cycle. The count is transferred to register 62 on the rise of the RDTX02 signal, one cycle into the next cell which gives a count of 50−8+1 or $43_{10}$. The PROMs 90 and 92 address location is $128+16+43=187_{10}$. The $128_{10}$ is added since bit A of FIG. 2c was a data bit and signal LTCH08+00 is a logical ONE.

Figure 7:
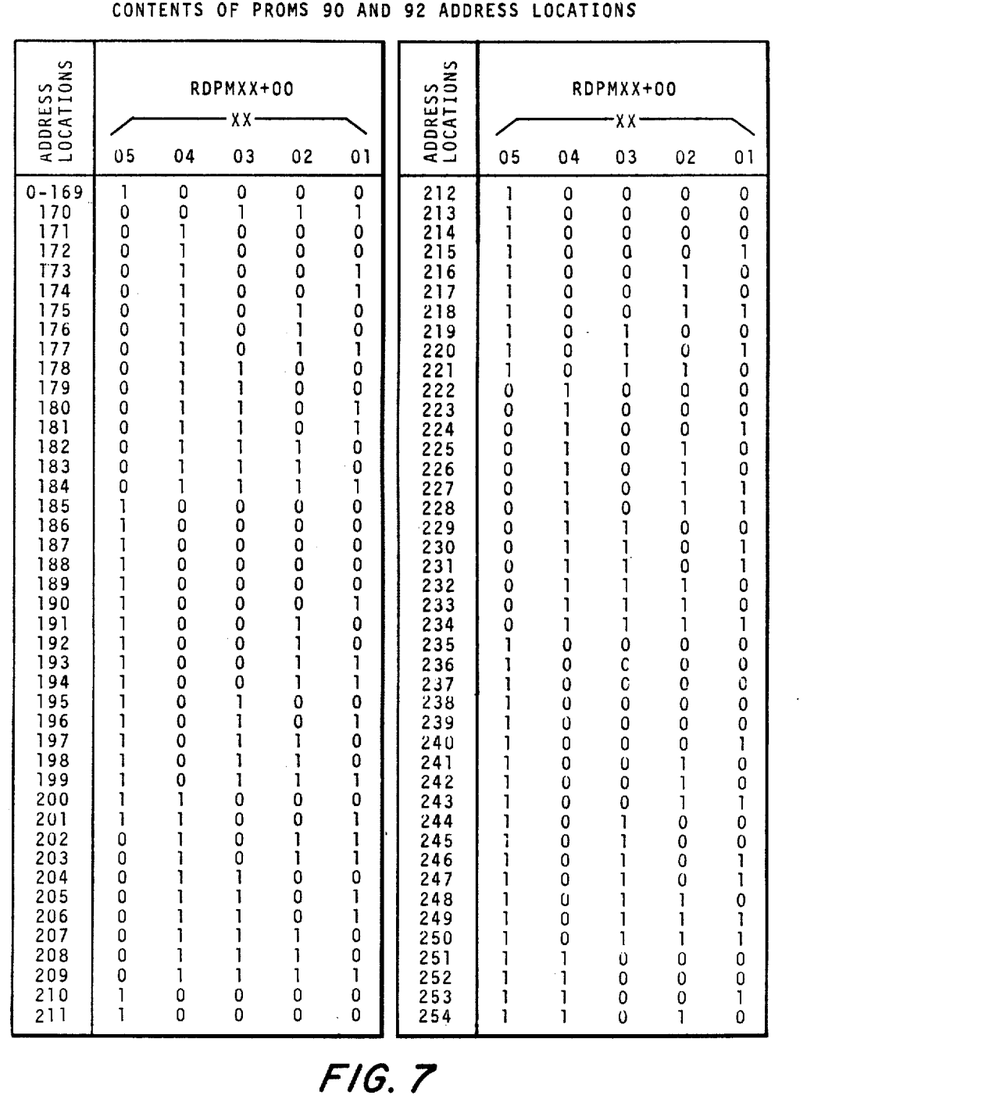
FIG. 7 is a layout of the information stored in the PROM address locations for presetting the counters.

Referring to FIG. 7, the content of address location $187_{10}$ is hexadecimal 10 or decimal 16.

From FIG. 2c data bit c is delayed 0.3 microseconds which would add a count of 7 which results in addressing location $194_{10}$ of PROMs 90 and 92.

From FIG. 7 the content of location $194_{10}$ is hexadecimal 13 or decimal 19 which is preset into counters 58 and 60. Data bit D FIG. 2c is received 0.16 microseconds early which results in an address location of 225 (128+19+85−7) and a preset value of hexadecimal 0A, FIG. 7 or decimal 10. Data bit E is received 0.3 microseconds late, thereby selecting address location $188_{10}$ or a preset quantity of hexadecimal 10.

Referring to FIG. 5, address location $187_{10}$ indicates that bit A is a data bit and bit B is a binary ONE data bit. Address location $194_{10}$ indicates that bit C is a binary ONE data bit. Address location $225_{10}$ indicates that two cells were read, the first cell having a data bit of binary ZERO and the second cell a data bit of binary ONE.

| LOGIC CIRCUITS IN THE PREFERRED EMBODIMENT | |
|---|---|
| Flop 30 | 74S74 |
| 66 | 74S74 |
| 76 | 74L74 |
| Shift Register 32,38 | 74S164 |
| 68 | 74S195 |
| Counters 58, 60 | 74LS169 |
| 84 | 74LS161 |
| Register 62 | 74LS374 |
| MUX 46 | 74LS157 |

The above circuits are described in "The TTL Data Book for Design Engineers", Second Edition, published by Texas Instruments Inc., Copyright 1976.

PROMs 64, 90 & 92 93446

The above PROMs are described in the "Bipolar Memory Databook", published in 1977 by the Fairchild Corporation, 464 Ellis Street, Mountainview, California 94042.

Having shown and described a preferred embodiment of the invention, those skilled in the art will realize that many variations are modifications may be made to affect the described invention and still be within the scope of the claimed invention. Thus, many of the elements indicated above may be altered or replaced by different elements which will provide the same results and fall within the spirit of the claimed invention. It is the intention, therefore, to limit the invention only as indicated by the scope of the claims.

What is claimed is:

1. A data memory system including apparatus for compensating for the varying frequency of clock signals and data signals in an information stream received from a device in a plurality of modes and for converting into decoded data signals comprising:
receiving means for storing each of said clock signals and said data signals at a predetermined logic level and generating a sequence of output data signals;
first shifting means coupled to said receiving means and responsive to each of said sequence of output data signals for generating a plurality of shift timing signals;
counting means coupled to said first shifting means and responsive to a first of said plurality of shift timing signals generated by a first of said sequence of output data signals for generating a sequence of interval timing signals;
register means coupled to said first shifting means and said counting means and responsive to a second of said plurality of shifting timing signals generated by a second of said sequence of output data signals and said sequence of interval timing signals for generating a plurality of latch signals indicative of the interval of time between said first and said second of said sequence of output data signals; and
read only memory means coupled to said register means and responsive to said latch signals for generating initialization signals representative of a variance of time between said first and said second of said sequence of output data signals and for generating a plurality of predetermined numbers indicative of an expected time between said first and said second of said sequence of output data signals;
said counting means being further coupled to said read only memory means and responsive to a third shift timing signal and said initialization signals for presetting said counting means for compensating for the difference between an expected time and an actual time between said each of said sequence of output data signals.

2. The system of claim 1 wherein said first shifting means comprises:
free running clock means for generating clock pulses; and
a shift register responsive to said clock pulses and said each of said sequence of output data signals for generating said plurality of shift timing signals.

3. The system of claim 2 wherein said counting means comprises:
a counter responsive to said clock pulses and said third shift timing signal for storing said initialization signals for presetting said counter and responsive to said clock pulses and said first timing signal for generating said sequence of interval timing signals indicative of a binary count of the preset value stored in said counter and the number of said clock pulses received when said first timing signal is in a first state.

4. The system of claim 3 wherein said register means comprises:
a register responsive to said second shift timing signal for storing said interval timing signals and generating said latch signals indicative of said binary count.

5. The system of claim 4 wherein said read only means comprises:
a read only memory responsive to said latch signals for addressing a selected location storing said initialization signals representative of a binary number indicative of said variance of time between said each of said sequence of output data signals and said plurality of predetermined numbers, said latch signals being indicative of said actual time and said plurality of predetermined numbers being indicative of said expected time.

6. The system of claim 5 wherein each of said plurality of predetermined numbers are integers.

7. The system of claim 6 including logic means for generating a mode signal in a first state indicative of a first of said plurality of modes being a modified frequency modulation mode (MFM) and generating said mode signal in a second state indicative of a second of said plurality of modes being a frequency modulation mode (FM), said read only memory being responsive to said mode signal in said first state and said latch signals for generating said initialization signals for presetting said counter in accordance with said information stream being in said MFM mode and responsive to said mode signal in said second state and said latch signals for presetting said counter in accordance with said information stream being in said FM mode.

* * * * *